United States Patent [19]
McCloy, II et al.

[11] Patent Number: 5,310,237
[45] Date of Patent: May 10, 1994

[54] STORAGE CONTAINER FOR INTERIOR OF MOTOR VEHICLE

[75] Inventors: James L. McCloy, II, Scottsdale; Gregory J. Carr, Glendale, both of Ariz.

[73] Assignee: Vehicular Accessories, Cleveland, Ohio

[21] Appl. No.: 877,787

[22] Filed: May 4, 1992

[51] Int. Cl.5 .......................... B60R 7/04; B60J 3/00
[52] U.S. Cl. .................. 296/97.5; 296/37.7; 296/37.8; 296/97.12; 224/311
[58] Field of Search ............ 296/37.7, 37.8, 97.1, 296/97.5, 97.9, 97.12; 224/277, 311, 312, 42.42, 42.43

[56] References Cited

U.S. PATENT DOCUMENTS 4,717,193 1/1988 Noriega .................. 296/37.7

FOREIGN PATENT DOCUMENTS 2515397 10/1976 Fed. Rep. of Germany ..... 296/37.7
2366147 4/1978 France ..................... 296/37.7

Primary Examiner—David M. Mitchell
Assistant Examiner—Andrew C. Pike
Attorney, Agent, or Firm—Tod R. Nissle

[57] ABSTRACT

A storage shelf is mounted on the ceiling of a motor vehicle using existing apertures in the ceiling which are exposed when the sun visors in the vehicle are removed. The storage shelf is installed on the ceiling of the vehicle without requiring that fasteners turn into and contact existing or new apertures which are in the ceiling of the vehicle.

2 Claims, 3 Drawing Sheets

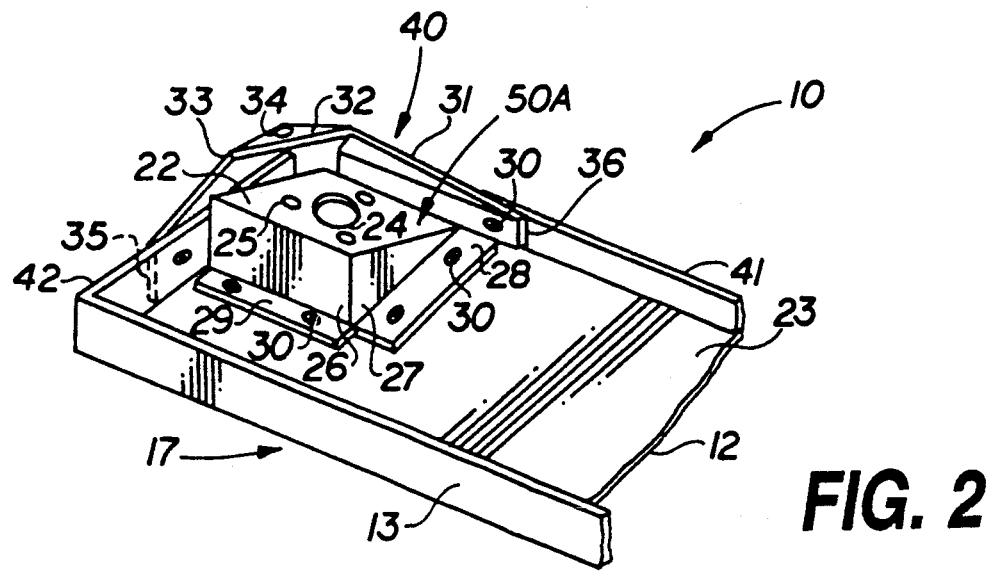
FIG. 2
FIG. 3
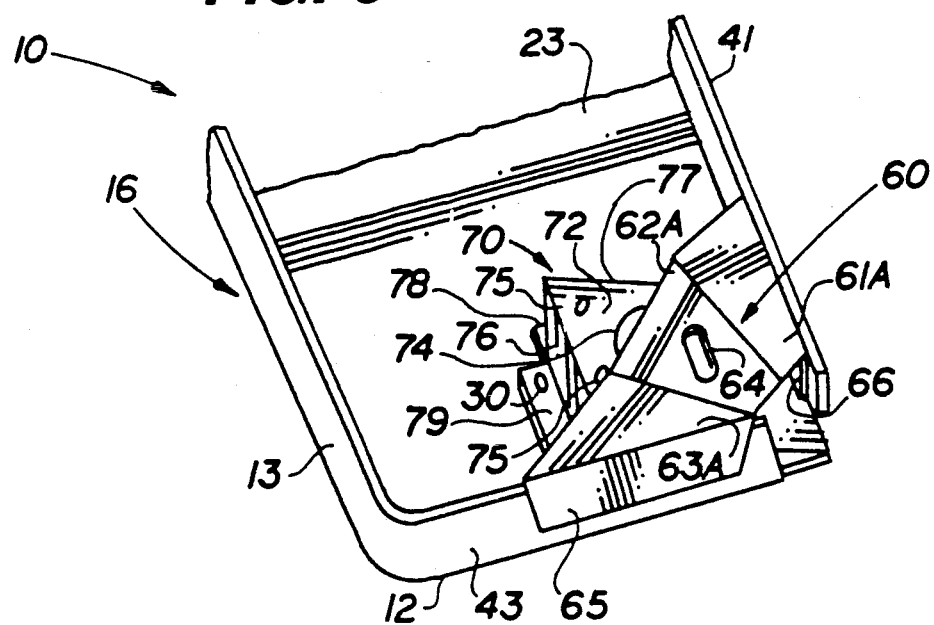

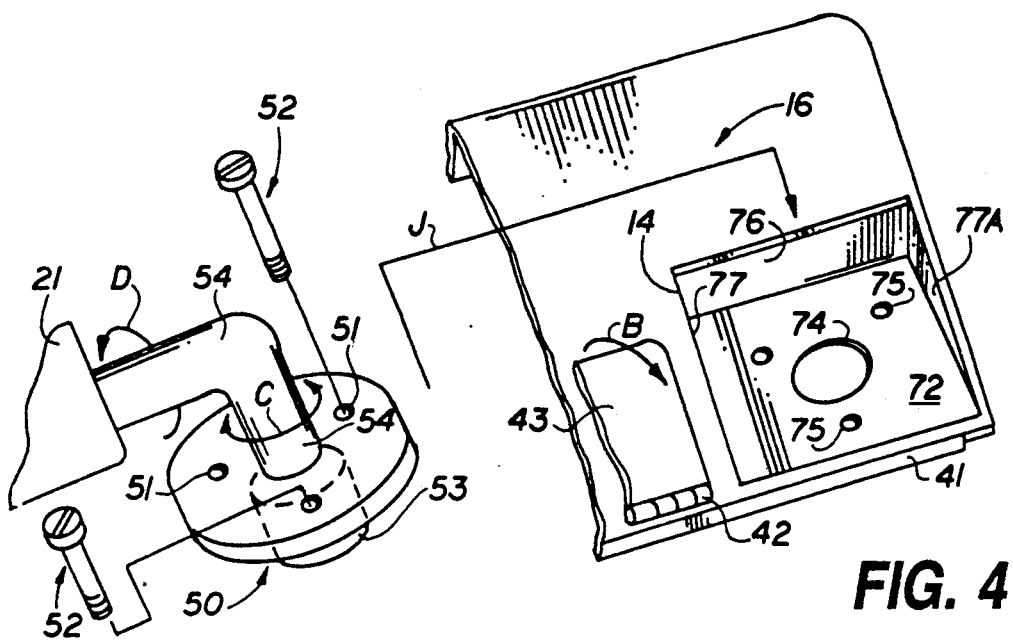
FIG. 4
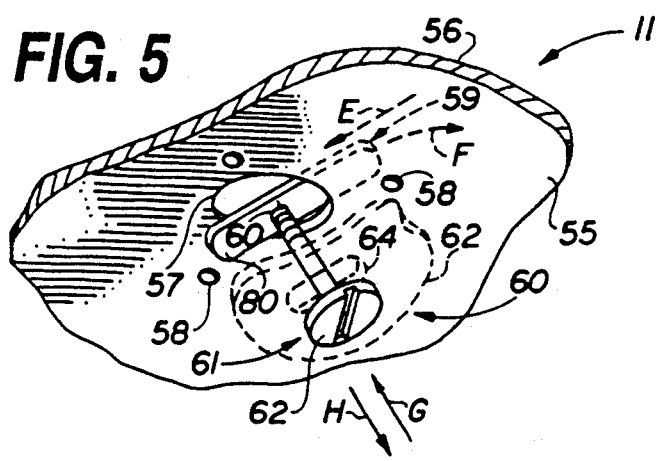
FIG. 5
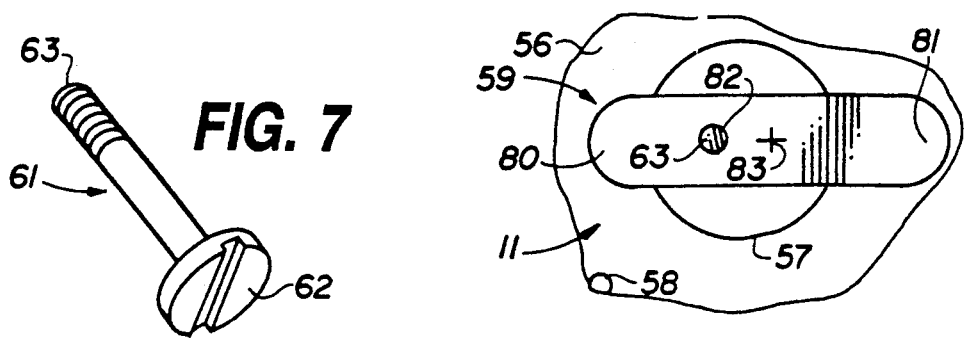
FIG. 7
FIG. 6

STORAGE CONTAINER FOR INTERIOR OF MOTOR VEHICLE

This invention relates to a storage container for a motor vehicle.

More particularly, the invention relates to a storage shelf which is mounted on the ceiling of a motor vehicle using existing apertures in the ceiling which are exposed when the sun visors in the vehicle are removed.

In a further respect, the invention relates to a storage shelf of the type described on which the existing sun visors of a vehicle can, after being removed from the ceiling of the vehicle, be mounted such that the sun visors can be pivoted through planes generally parallel to the ceiling of the vehicle.

In still another respect, the invention relates to a storage shelf of the type described which is installed on the ceiling of a vehicle without requiring that externally threaded fasteners contact and thread into existing or new apertures which are in the ceiling of the vehicle.

Storage containers which are mounted on the ceilings of vehicles are well known in the art. See, for example, U.S. Pat. Nos. 4,079,987 to Bumgardener, 4,469,365 to Marcus et al., and 4,717,193 to Noriega. Such prior art systems typically suffer from one or more disadvantages.

First, prior art systems often leave existing sun visors in place on the ceiling of a vehicle, which restricts the size and shape of the container mounted on the ceiling. The container can not be overly long or deep or it interferes with the freedom of motion of the existing sun visors.

Second, when a prior art storage container makes allowances for removal of the sun visor from the ceiling of the vehicle, the visor ordinarily is re-installed on the storage container after the container is attached to the vehicle ceiling. When the sun visor is mounted to its original position on the ceiling of a vehicle and is pivoted from a position adjacent the windshield to a position adjacent a door window, the visor moves through an arc of travel which is generally parallel to the roof of the vehicle. If the sun visor is removed from its original position on the ceiling of a vehicle and is then attached to the bottom of a container which is attached to the vehicle ceiling, then, in prior art system, when the visor is pivoted from the windshield through an arc to a door window, the visor no long moves through a plane which is generally parallel to the roof of the vehicle. Instead, the sun visor moves through a plane which is canted with respect to the vehicle roof. This makes use of the visor adjacent the door window awkward.

Third, when prior art systems remove existing sun visors to permit a storage container to be installed on the ceiling of a vehicle, the container is attached to the ceiling of the vehicle either by using the same screw holes which were used to attach the base of the sun visor, or by drilling new screw holes of comparable size in the ceiling. While such screw holes are sufficient for bearing the weight of a sun visor, they may not be sufficient to support the weight of a storage container holding batteries, flashlights, or other items.

Fourth, when the OEM sun visors of a vehicle are removed, a storage container is mounted on the vehicle ceiling, the sun visors are re-installed on the storage container, and the sun visors are pivoted away from the windshield and positioned adjacent the door windows of a motor vehicle, then prior art ceiling mounted storage containers do not provide a way of blocking light entering the vehicle through the windshield of the vehicle.

Accordingly, it would be highly desirable to provide an improved ceiling-mounted storage container for a motor vehicle which could be installed after existing sun visors were removed from the ceiling of the vehicle, which would permit re-installation of the sun visors on the container such that the sun visors could be pivoted through an arc of travel generally parallel to the ceiling of the vehicle, which could be installed on the ceiling without requiring the threading of screws into existing screw holes in the ceiling, and which would provide a normal means for blocking sun light from entering the vehicle through the windshield when the OEM sun visors were pivoted to a position against the door windows.

Therefore, it is a principal object of the invention to provide an improved ceiling-mounted storage container for a motor vehicle.

Another object of the invention is to provide an improved ceiling-mounted container for a motor vehicle which is installed after existing sun visors are removed from the ceiling and which permits re-installation of the sun visors on the ceiling mounted container such that the sun visors can be pivoted from the windshield to the door window through an arc generally parallel to the ceiling.

A further object of the invention is to provide an improved ceiling-mounted container for a motor vehicle which is mounted on the ceiling of the vehicle without requiring that screws be threaded into screw holes formed in the ceiling.

Still another object of the invention is to provide an improved ceiling-mounted storage container for a motor vehicle which can simultaneously block light entering through the windshield and through the two front seat door windows of the vehicle.

These and other, further and more specific objects and advantages of the invention will be apparent to those skilled in the art from the following detailed description thereof, taken in conjunction with the drawings in which:

FIG. 2 is a perspective view of one end of the container of FIG. 1;

FIG. 3 is a perspective view of the other end of the container of FIG. 1;

FIG. 4 is a bottom view of the end of the container illustrated in FIG. 3 illustrating the installation of the base of a sun visor thereon;

FIG. 5 is a partial perspective view of the ceiling of a motor vehicle illustrating installation of container of the invention thereon;

FIG. 6 is a top view of a elongate member used to install the container of the invention on the ceiling of a vehicle; and, FIG. 7 is a perspective view of a fastener used to install the container of the invention on the ceiling of a vehicle.

Figure 1:
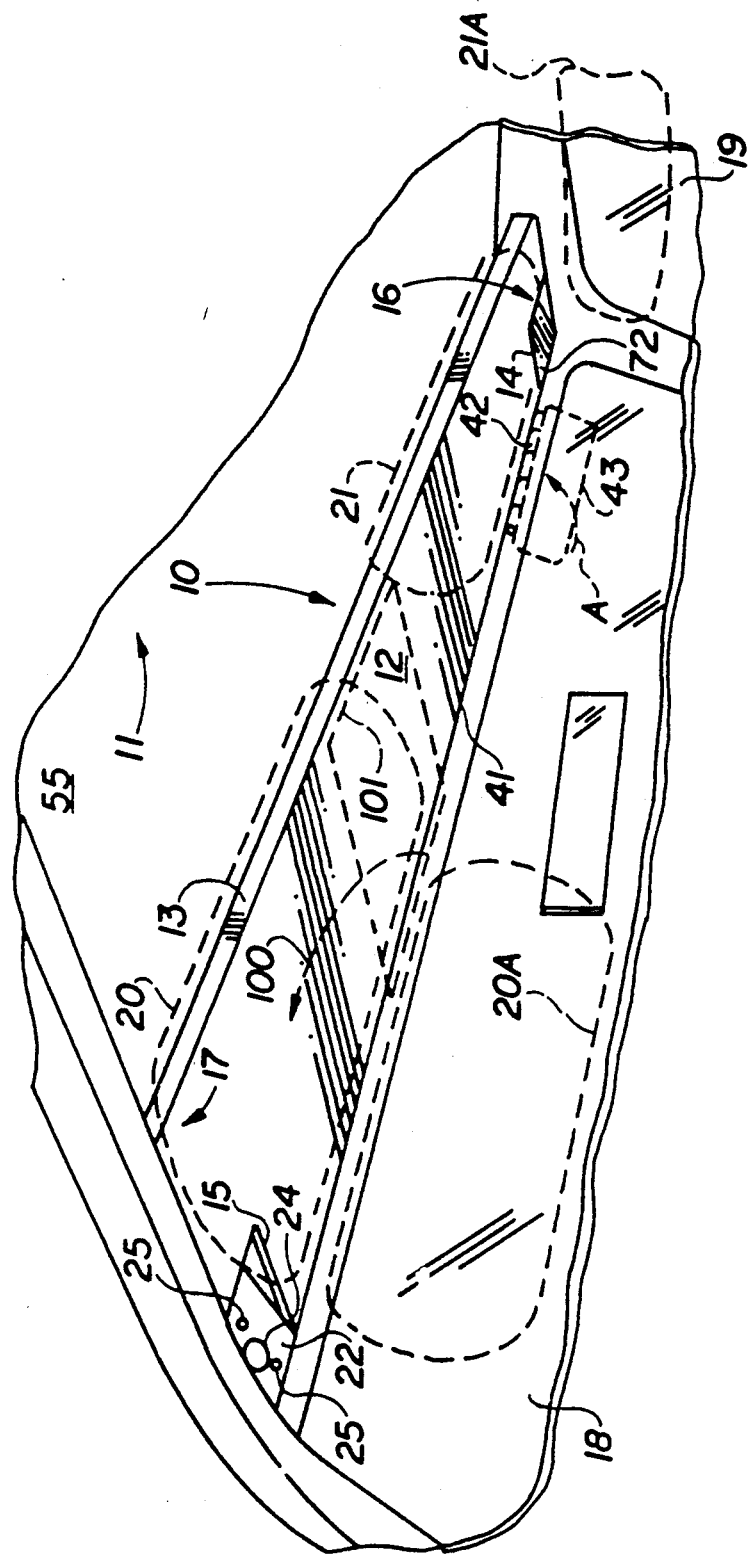
FIG. 1 is a perspective view illustrating a container mounted on the ceiling of a motor vehicle in accordance with the principles of the invention.

Briefly, in accordance with our invention, we provide a storage container for the interior of a motor vehicle. The vehicle includes at least one sun visor and a ceiling. The sun visor includes a base; a plurality of fastener holes formed through the base; a visor; a support arm pivotally mounted in the base and including a first portion extending through the base and a second portion extending outwardly from the base and the first portion of the visor; and, a plurality of fasteners each having a threaded end sized to pass through at least one of the fastener holes. The ceiling includes a first aperture shaped to receive the first portion of the support arm; and, a plurality of secondary apertures each spaced apart from the first aperture and shaped to receive the threaded end of one of the fasteners so that the base of the sun visor can be removably attached to the ceiling by passing the threaded end of each of the fasteners through one of the fastener holes in the sun visor base and turning the threaded end into one of the secondary apertures. The support arm of the visor is mounted in the base such that when the base is attached to the ceiling and the support arm is pivoted in the base, the visor follows a path of travel lying in a plane which is generally parallel to and spaced apart from the ceiling. The storage container includes an elongate shelf having an upper surface and a lower surface and first and second ends; an aperture formed through the first end and sized to permit the base of the sun visor to pass therethrough; a support surface attached to the panel member above the aperture; and, means for attaching the storage shelf to the ceiling of the motor vehicle. The support surface is sloped with respect to the upper surface and includes a primary aperture shaped to receive the first portion of the sun visor; and, a plurality of auxiliary apertures each spaced apart from the primary aperture and from one another such that after the fasteners are removed from the base of the sun visor and the sun visor is removed from the ceiling, the base of the sun visor can be attached to the support surface by aligning the auxiliary apertures with the fastener holes and inserting fastener means through each auxiliary aperture—fastener hole pair to secure the base to the support surface. The support surface is oriented such that when the base of the sun visor is attached to the support surface with the fastener means and the sun visor support arm is pivoted in the base, the visor follows a path of travel generally parallel to the ceiling of the motor vehicle.

In another embodiment of our invention, we provide a storage container for the interior of a motor vehicle. The vehicle includes at least one sun visor and a ceiling. The sun visor includes a base; a plurality of fastener holes formed through the base; a visor; a support arm pivotally mounted in the base and including a first portion extending through the base and a second portion extending outwardly from the base and the first portion of the visor; and, a plurality of fasteners each having an end sized to pass through at least one of the fastener holes. The ceiling includes a ceiling aperture shaped to receive the first portion of the support arm; and, a plurality of secondary apertures each spaced apart from the ceiling aperture and shaped to receive the end of one of the fasteners so that the base of the sun visor can be removably attached to the ceiling by passing the end of each of the fasteners through one of the fastener holes in the sun visor base and through one of the secondary apertures. The support arm of the visor is mounted in the base such that when the base is attached to the ceiling and the support arm is pivoted in the base, the visor follows a path of travel lying in a plane which is generally parallel to and spaced apart from the ceiling. The storage container includes an elongate shelf having a pair of ends; a mounting member supported on one of said ends and having an opening formed therethrough; and means for attaching the storage container to the ceiling of the motor vehicle after the fasteners are removed from the base of the visor and the visor is removed from the ceiling. The attaching means includes an elongate member having first and second ends and having a length greater than said width of the ceiling aperture such that the first end can be inserted from the interior of the motor vehicle a selected distance into and through the first aperture, the second end can then be inserted through the aperture from the interior of the motor vehicle, and the elongate member can be positioned such that the elongate member spans the ceiling aperture and the first and second ends contact the back surface of the ceiling; an elongate fastening member including a head and an elongate arm attached to the head, the head being sized to prevent the head from passing through the aperture in the mounting member, the arm being sized to pass through the aperture in the mounting member; and, mean for attaching the arm to the elongate member. The storage container is attached to the ceiling by sliding the arm of the fastening member through the aperture in the mounting member, attaching the arm to the elongate member such that the aperture in the mounting member is intermediate the head of the fastening member and the elongate member, and inserting the elongate member through the ceiling aperture such that the elongate member spans the ceiling aperture, the first and second ends of the elongate member contact the back surface of the ceiling, and the arm of the fastening member extends from the elongate member, through the ceiling aperture, and through the aperture in the mounting member to the head of the fastening member.

In a further embodiment of the invention, we provide a storage container for mounting on the ceiling in the interior of a motor vehicle adjacent the windshield of a vehicle. The storage container includes an elongate shelf having a leading edge; means for attaching the storage container to the ceiling of the motor vehicle with the leading edge facing the windshield; a sun visor; and, means for attaching the visor to the leading edge to pivot about an axis generally parallel to the windshield.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a storage container generally indicated by reference character 10 and including a shelf having an upper surface 23 (FIG. 2), a lower surface 12, a left hand (from the perspective of the driver of the vehicle) end 17, and a right hand end 16. The storage container is mounted on the ceiling 11 of a motor vehicle adjacent the front windshield 18 of the vehicle. A front lip 13 and rear lip or leading edge 41 (FIG. 2) upwardly depend from the shelf. Square aperture 15 is formed through end 17. Square aperture 14 is formed through end 16. Apertures 14 and 15 are of equivalent size. Sloped surface 22 extends over aperture 15. Sloped surface 72 extends over aperture 14. The base of a left hand sun visor, indicated by dashed lines 20 in FIG. 1, is normally attached to surface 22 and the base of a right hand sun visor, indicated by dashed lines 21 in FIG. 1, is normally attached to surface 72. These sun visor bases have been omitted from FIG. 1 for the sake of clarity. In FIG. 1, sun visor 20 is shown in its normal storage position adjacent the lower surface 12 of the container 10. When the driver of the vehicle wishes to block light passing through windshield 18 into the interior of the motor vehicle, he rotates visor 20 in conventional fashion from a position adjacent lower surface 12 down to the position adjacent windshield 18 indicated by dashed lines 20A in FIG. 1. Dashed lines 21 illustrate the normal storage position of the right hand sun visor against the lower surface 12 of container 10. When a passenger in the front seat of the vehicle wishes to minimize the amount of light passing through door window 19 into the interior of the motor vehicle, the passenger moves the visor to a position adjacent the windshield (which position is similar to the position of visor 20 indicated by dashed lines 20A) and then pivots the visor through an arc of travel to the position indicated by dashed lines 21A against the side window 19. The arc of travel through which the visor travels while moving from the windshield 18 to side window 19 is, as is well known, generally parallel to the ceiling 11 of the motor vehicle. Hinge 42 connects optional secondary visor 43 to the rear lip or leading edge 41 of container 10. In FIG. 1, dashed lines 43 indicate the position of the visor against windshield 18. The visor 43 can be pivoted in the direction of arrow A to a storage position adjacent the lower surface 12 of container 10. Visor 43 can be pivoted in the direction of arrow B in FIG. 4. Ceiling 11 includes inner surface 55 facing the interior of the motor vehicle and back surface 56 (FIG. 5) not visible in FIG. 1.

As illustrated in FIG. 4, visor 21 is attached to a base 50 in conventional fashion by a support arm which is mounted in base 50 for pivotal movement in the directions indicated by arrows C. The support arm includes a first portion 53 which extends through base 50 and includes a second portion 54 which extends outwardly from the base 50 and from the first portion 53 to the visor 21. A plurality of fastener holes 51 are formed through base 50 to receive externally threaded fasteners 52. The base 50 of visor 21 is, prior to installation of container 10 on the ceiling 11 of the motor vehicle, normally secured to the upper right hand corner of ceiling 11 by aligning fastener holes 51 with the secondary apertures 58 (FIG. 5) formed in ceiling 11 and by turning a fastener 52 into each fastener hole 51—secondary aperture 58 pair. When base 50 is secured to ceiling 11 in this matter, the second portion 53 of the support arm of the visor extends in conventional fashion into ceiling aperture 57. As appreciated by those of skill in the art, visor 20 is attached to a base and support arm similar to base 50 and its support arm, and visor 20 and its base and support arm are essentially mirror images of visor 21, of base 50, and of the support arm which interconnects visor 21 and base 50. A ceiling aperture and secondary apertures (not shown) equal in size to apertures 57 and 58, respectively, are formed in the upper left hand corner of ceiling 11 to receive the base of visor 20. As will be described, prior to the installation of container 10 in the manner shown in FIG. 1, the base of each visor 20, 21 is removed from the ceiling 11, leaving the apertures 57 and 58 in the upper right hand corner of ceiling 11 and the ceiling aperture and secondary apertures in the upper left hand corner (for the base of visor 20) of ceiling 11 exposed.

The structure of the left hand corner 17 of container 10 is further illustrated FIG. 2. Housing 50A includes support surface 22, panels 26, 27, and flanges 28 and 29. Surface 22 is maintained in a canted orientation with respect to upper surface 23 by side panels 26 and 27 which downwardly depend from surface or panel 22. Panel 26 is attached to flange 29. Flange 29 is attached to surface 23 by rivets 30 or other fastening means. Panel 27 is attached to flange 28. Flange 28 is attached to surface 23 by rivets 30 or other fastening means. Aperture 24 is formed through surface 22 and is equal in size to ceiling aperture 57. Internally threaded apertures 25 are formed through surface 22 and are equal in shape and dimension to secondary ceiling apertures 58. Apertures 25 can also, if desired, be flare punched so the threads of a metal screw engage apertures 25. The spacing of apertures 25 with respect to one another and aperture 24 is equivalent to the spacing of secondary ceiling apertures with respect to one another and to the ceiling aperture in the upper left hand corner of ceiling 11. In other words, the fastener holes formed in the base of visor 20 can be aligned with apertures 25 and the first portion of the visor support arm can extend into aperture 24 when the base of visor 20 is inserted through aperture 15 and placed against surface 22. Aperture 15 is large enough to permit base 50 to be inserted therethrough.

In FIG. 2, mounting bracket or member 40 includes interconnected panel members 31, 32, 33, 35, 36. Panel members 35 and 36 are connected to end edge 42 and leading edge 41 by rivets 30 or other fastening means. Oval-shaped aperture 34 is formed through panel member 32.

The structure of the right hand corner 16 of container 10 is further illustrated FIGS. 3 and 4. Housing 70 is generally a mirror image of housing 50A and includes support surface 72, panels 76, 77, 77A, and flanges 78 and 79. Surface 72 is maintained in a canted orientation with respect to upper surface 23 by side panels 76 and 77 which downwardly depend from surface or panel 72. Panel 76 is attached to flange 79. Flange 79 is attached to surface 23 by rivets 30 or other fastening means. Panel 77 is the mirror image of panel 27 is attached to flange 78. Flange 78 is the mirror image of flange 28 of housing 50A and is attached to surface 23 by rivets 30 or other fastening means. Aperture 74 is formed through surface 72 and is equal in size to ceiling aperture 57. Apertures 75 are formed through surface 72 and are equal in shape and dimension to secondary ceiling apertures 58. The spacing of apertures 75 with respect to one another and aperture 74 is equivalent to the spacing of secondary ceiling apertures 58 with respect to one another and to the ceiling aperture 57 in the upper right hand corner of ceiling 11 in FIG. 1. In other words, the fastener holes 51 formed in the base 50 of visor 21 can be aligned with apertures 75 and the first portion 53 of the visor support arm can extend into aperture 74 when the base 50 of visor 21 is inserted through aperture 14 and placed against surface or member 72. Aperture 14 is large enough to permit base 50 to be inserted therethrough.

In FIG. 3, mounting bracket or member 60 is generally a mirror image of support member 40 and includes interconnected panel members 61A, 62A, 63A, 65, 66. Panel members 65 and 66 are connected to end edge 44 and leading edge 41 by rivets 30 or other fastening means. Oval-shaped aperture 64 is formed through panel member 62A.

The elongate member 59 of FIG. 6 and the elongate fastening member 61 of FIG. 7 are utilized in conjunction with a mounting bracket or member 40, 60 and with a ceiling aperture (like aperture 57 in the upper right hand corner of ceiling 11) to secure container 10 to ceiling 11 in the position shown in FIG. 1. Fastening member 61 includes head 62 and elongate externally threaded arm 63 attached to head 62. Head 62 is sized so that head 62 cannot pass through an oval aperture 34, 64. Elongate member 59 includes a first end 80 and second end 81 and off center internally threaded aperture 82 which receives the externally threaded end 63 of fastening member 61. Aperture 82 is spaced apart from the geometric center 83 of member 59.

The installation of member 59 by utilizing ceiling aperture 57 and a mounting member 60 adjacent the upper right hand corner of ceiling 11 is illustrated in FIGS. 5 and 6. The elongate arm 63 is inserted through oval aperture 64 of mounting bracket 60 and is threaded into aperture 82 of member 59. The head 62 of fastening member 61 supports bracket 60 because head 62 is too large to fit through oval aperture 64. One end 81 is inserted through aperture 57 in the direction indicated by arrow F in FIG. 5 until arm 63 contacts the circular peripheral edge of ceiling aperture 57. Once arm 63 contacts the edge of aperture 57, end 80 can be pushed into and through aperture 57 in the direction of arrow G. After end 80 is pushed through aperture 57, member 59 is displaced in the direction of arrow E (FIG. 5), and then in the direction of arrow H to the position illustrated in FIG. 6 with ends 80 and 81 bearing against the back surface 56 of ceiling 11. If desired, arm 63 can be threaded through aperture 82 to move head 62 and bracket 60 toward and against inner surface 55 of ceiling 11. Another fastening member 61 and elongate member 59 can be utilized in conjunction with bracket 40 and with the ceiling aperture formed in the upper left hand corner of ceiling 11 to secure end 17 of container 10 to the ceiling 11 in the same manner that end 16 is secured to the upper right hand corner of ceiling 11 using ceiling aperture 57.

In use, the existing visors 20 and 21 are removed from the ceiling of a motor vehicle by removing the fasteners 52 from the base 50 of each visor and removing the base and visor from ceiling 11. Container 10 is affixed to the ceiling 11 in the position shown in FIG. 1 by using a fastener 61 and member 59 to secure bracket 40 to the upper left hand corner of ceiling 11 and using another fastener 61 and member 59 to secure bracket 60 to the upper right hand corner of ceiling 11 in the manner described above. After brackets 40 and 60 are secured adjacent ceiling 11, the right hand original equipment visor which was removed from ceiling 11 is attached to support surface 72 and the left hand original equipment visor which was earlier removed from ceiling 11 is attached to support surface 22. The base of the right hand visor 21 is moved in the direction indicated by arrow J in FIG. 4 and is secured to and against support surface 72 by fasteners 52 which extend through fastener holes 51 and apertures 75 in surface 72. Apertures 51 align with apertures 75. The externally threaded end of each fasteners 52 threaded into an internally threaded aperture 75. Similarly, the base of the left hand visor 21 is secured to and against support surface 22 by fasteners 52 which extend through the fastener holes formed in the visor base and through internally threaded apertures 25 in support surface 22. The orientation of surface 22 replicates the orientation of the upper left hand corner of ceiling 11 such that when the base of the left hand visor 20 is attached to surface 22, the orientation of the base is about the same as when the base is in its OEM position directly attached to the left hand corner of ceiling 11. Consequently, even though the base of visor 20 is in a lower position when it is attached to surface 22, the visor still moves in a plane 101 parallel to the ceiling 11 when the visor is pivoted along a path 100 from the position indicated by dashed lines 20A to a position against the window of the driver side front door of the motor vehicle. When the visor is pivoted between the door window and the position indicated by dashed lines 20A in FIG. 2, the support arm of the visor is pivoted in directions comparable to those indicated by arrows C in FIG. 4. Similarly, when visor 21 is, after being secured to surface 72, pivoted between door window 19 and the front windshield 18, the second portion of the support arm of the visor pivots in the directions indicated by arrows C in FIG. 4, and, visor 21 also pivots through an arc of travel which is generally parallel to the ceiling 11 and which is generally parallel to the arc of travel through which visor 21 pivots when the visor is in its original OEM position attached directly to the ceiling 11.

Support brackets or members 40 and 60 can have any desired shape and dimension which permits a fastener 61 to be used in conjunction with member 59 to secure container 10 to ceiling 11 using apertures 74 formed through ceiling 11. The shape and dimension of fastener 61 and member 59 can be similarly varied as desired. The shape, dimension, and spacing of apertures 74, 75, 24, 25 can be varied as necessary to align with the fastener holes 51 and first portions 53 of any existing sun visor. Lips 13 and 41 can each have a rounded upper edge or hem. Such a hem is formed by bending the edge of lip 13, 41 back over onto itself. Each lip 13, 41 can also be arcuate instead of flat.

Having described our invention in such terms as to enable those skilled in the art to understand and practice it, and having identified the presently preferred embodiments thereof, we claim:

1. A storage container for the interior of a motor vehicle, said vehicle including
    at least one sun visor including
        a base,
        a plurality of fastener holes formed through the base,
        a visor,
        a support arm pivotally mounted in the base and including a first portion extending through the base and a second portion extending outwardly from the base and the first portion to the visor, and
        a plurality of fasteners each sized to pass through at least one of the fastener holes,
    a ceiling including
        a ceiling aperture shaped to receive said first portion of said support arm, and
        a plurality of secondary apertures each spaced apart from the ceiling aperture and shaped to receive one of the fasteners so that the base of the sun visor can be removably attached to the ceiling by passing the end of each of the fasteners through one of the fastener holes in the sun visor base and into one of the secondary apertures, the support arm of the sun visor being mounted in the base such that when the base is attached to the ceiling and the support arm is pivoted in the base the visor follows a path of travel lying in a plane which is parallel to and spaced apart from the ceiling,
    the storage container including
        (a) an elongate shelf having an upper surface and a lower surface and first and second ends;

(b) an aperture formed through said first end and sized to permit the base of the sun visor to pass therethrough;
(c) a support surface attached to said upper surface of said elongate shelf above said aperture in said first end, said support surface being sloped with respect to said upper surface and including
(i) a primary aperture shaped to receive the first portion of the support arm of the sun visor, and
(ii) a plurality of auxiliary apertures each spaced apart from said primary aperture and from one another such that after the fasteners are removed from the base of the sun visor and the sun visor is removed from the ceiling, the base of the sun visor can be attached to said support surface by aligning the fastener holes in the base with said auxiliary apertures and passing fastening means through each fastener hole—auxiliary aperture pair,
said support surface being oriented such that when the base of the sun visor is attached to said support surface and the sun visor support arm is pivoted in the base, the visor follows a path of travel parallel to the ceiling of the motor vehicle; and,
(d) means for attaching said storage container to the ceiling of the motor vehicle.

2. A storage container for the interior of a motor vehicle, said vehicle including
at least one sun visor including
a base,
a plurality of fastener holes formed through the base,
a visor,
a support arm pivotally mounted in the base and including a first portion extending through the base and a second portion extending outwardly from the base and the first portion to the visor, and
a plurality of fasteners each sized to pass through at least one of the fastener holes,
a ceiling having a inner surface facing the interior of the motor vehicle and a back surface facing away from the interior of the motor vehicle and including
a ceiling aperture formed through the ceiling, extending from said inner to said back surface, and shaped to receive said first portion of said support arm and having a selected width, and
a plurality of secondary apertures each shaped apart from said first aperture and shaped to receive one of the fasteners so that the base of the sun visor can be removably attached to the ceiling by passing each of the fasteners through one of the fastener holes in the sun visor base and into one of the secondary apertures, the support arm of the sun visor being mounted in the base such that when the base is attached to the ceiling and the support arm is pivoted in the base the visor follows a path of travel lying in a plane which is parallel to and spaced apart from the ceiling,
the storage container including
(a) an elongate shelf having a pair of ends;
(b) a mounting member supported on one of said ends and having an opening formed therethrough; and,
(c) means for attaching said storage container to the ceiling of the motor vehicle after the fasteners are removed from the base of the sun visor and the sun visor is removed from the ceiling, said attaching means including
(i) an elongate anchor member having first and second ends and having a length greater than said width of the ceiling aperture such that
said first end can be inserted from the interior of the motor vehicle a selected distance into and through the ceiling aperture,
said second end can be inserted from the interior of the motor vehicle through the ceiling aperture after said first end is inserted through the ceiling aperture, and
said elongate anchor member can be positioned such that said elongate anchor member spans the ceiling aperture and said first and second ends contact the back surface of the ceiling,
(ii) an elongate fastening member including a head and an elongate arm attached to said head, said head being sized to prevent said head from passing through said opening in said mounting member, said arm attached to said head of said fastening member being sized to extend from said head of said fastening member through said opening in said mounting member and through the ceiling aperture to said anchor member when said anchor member is inserted through the ceiling aperture and contacts the back surface of the ceiling,
(iii) means for attaching said arm of said fastening member to said elongate anchor member.

* * * * *